(12) United States Patent
Soma et al.

(10) Patent No.: US 11,815,225 B2
(45) Date of Patent: Nov. 14, 2023

(54) LUBRICANT APPLICATOR FOR A BALL HITCH

(71) Applicant: EZ Grease'n Go LLC, Oxford, PA (US)

(72) Inventors: Scott J. Soma, Media, PA (US); William C. Groves, Jr., Oxford, PA (US); Eric L. Canfield, Downingtown, PA (US)

(73) Assignee: EZ GREASE'N GO LLC, Oxford, PA (US)

( * ) Notice: Subject to any disclaimer, the term of this patent is extended or adjusted under 35 U.S.C. 154(b) by 222 days.

(21) Appl. No.: 17/524,193

(22) Filed: Nov. 11, 2021

(65) Prior Publication Data

US 2022/0282831 A1    Sep. 8, 2022

Related U.S. Application Data

(60) Provisional application No. 63/156,489, filed on Mar. 4, 2021.

(51) Int. Cl.
*F16N 3/10* (2006.01)
*B60D 1/58* (2006.01)

(52) U.S. Cl.
CPC ............... *F16N 3/10* (2013.01); *B60D 1/586* (2013.01)

(58) Field of Classification Search
CPC ............. F16N 3/10; B60D 1/06; B60D 1/586
See application file for complete search history.

(56) References Cited

U.S. PATENT DOCUMENTS

| 2,558,906 | A | * | 7/1951 | Leon | ............... | B60D 1/065 |
| | | | | | | 280/511 |
| 2,985,256 | A | * | 5/1961 | Simmons | ............... | F16N 11/10 |
| | | | | | | 184/45.1 |
| 3,659,675 | A | * | 5/1972 | Edelstein | ............... | H01L 23/535 |
| | | | | | | 184/7.3 |
| 3,739,877 | A | * | 6/1973 | Oliveri | ............... | F16N 11/04 |
| | | | | | | 184/45.1 |

(Continued)

*Primary Examiner* — Michael A Riegelman
(74) *Attorney, Agent, or Firm* — Panitch Schwarze Belisario & Nadel LLP

(57) ABSTRACT

A lubricant applicator for a ball hitch includes a diaphragm assembly, a hollow support structure, and preferably, a removable cover. The diaphragm assembly includes a diaphragm member and may also include a peripheral sidewall. The diaphragm member has a non-permeable top surface having an inner facing surface and an outer facing surface. A central region of the inner facing surface is coated with lubricant that is releasable from the inner facing surface when pressed against an external surface and, optionally, rotated slightly. The hollow support structure has a peripheral sidewall. The diaphragm assembly is positionally secured within the hollow support structure to provide a unitary structure. The lubricant-coated central region of the diaphragm member is configured to deform and partially encapsulate at least an upper portion of the ball hitch when the lubricant applicator is centered over the ball hitch and pressed down over the ball hitch to allow release and transfer of at least a portion of the lubricant from the inner facing surface of the diaphragm member to the at least upper portion of the ball hitch.

12 Claims, 14 Drawing Sheets

(56) References Cited

U.S. PATENT DOCUMENTS

| | | | | |
|---|---|---|---|---|
| 4,832,360 | A | * | 5/1989 | Christian .................. B60D 1/06 |
| | | | | 280/511 |
| 5,040,817 | A | * | 8/1991 | Dunn .................. F16C 11/0609 |
| | | | | 280/504 |
| 5,205,574 | A | * | 4/1993 | Heath .................... B60D 1/586 |
| | | | | 280/495 |
| 5,222,755 | A | * | 6/1993 | O'Neal .................... B60D 1/60 |
| | | | | 280/507 |
| 5,971,418 | A | * | 10/1999 | Lindenman ........ B62D 53/0828 |
| | | | | 280/901 |
| 6,450,690 | B1 | * | 9/2002 | Dischler .................. F16C 35/04 |
| | | | | 384/473 |
| 7,431,321 | B2 | | 10/2008 | Terpsma et al. |
| 2003/0150140 | A1 | * | 8/2003 | Takayama ............... E02F 9/006 |
| | | | | 37/458 |
| 2004/0239077 | A1 | * | 12/2004 | Terpsma .................. B60D 1/28 |
| | | | | 280/504 |
| 2007/0080036 | A1 | * | 4/2007 | Elie ...................... F16D 37/008 |
| | | | | 192/84.951 |
| 2013/0039696 | A1 | * | 2/2013 | Mori ...................... F16D 1/116 |
| | | | | 403/330 |
| 2018/0001722 | A1 | * | 1/2018 | Amaral .................... B60D 1/60 |
| 2019/0120413 | A1 | * | 4/2019 | Verma .................. F16L 37/121 |
| 2022/0282831 | A1 | * | 9/2022 | Soma .................... B60D 1/586 |

* cited by examiner

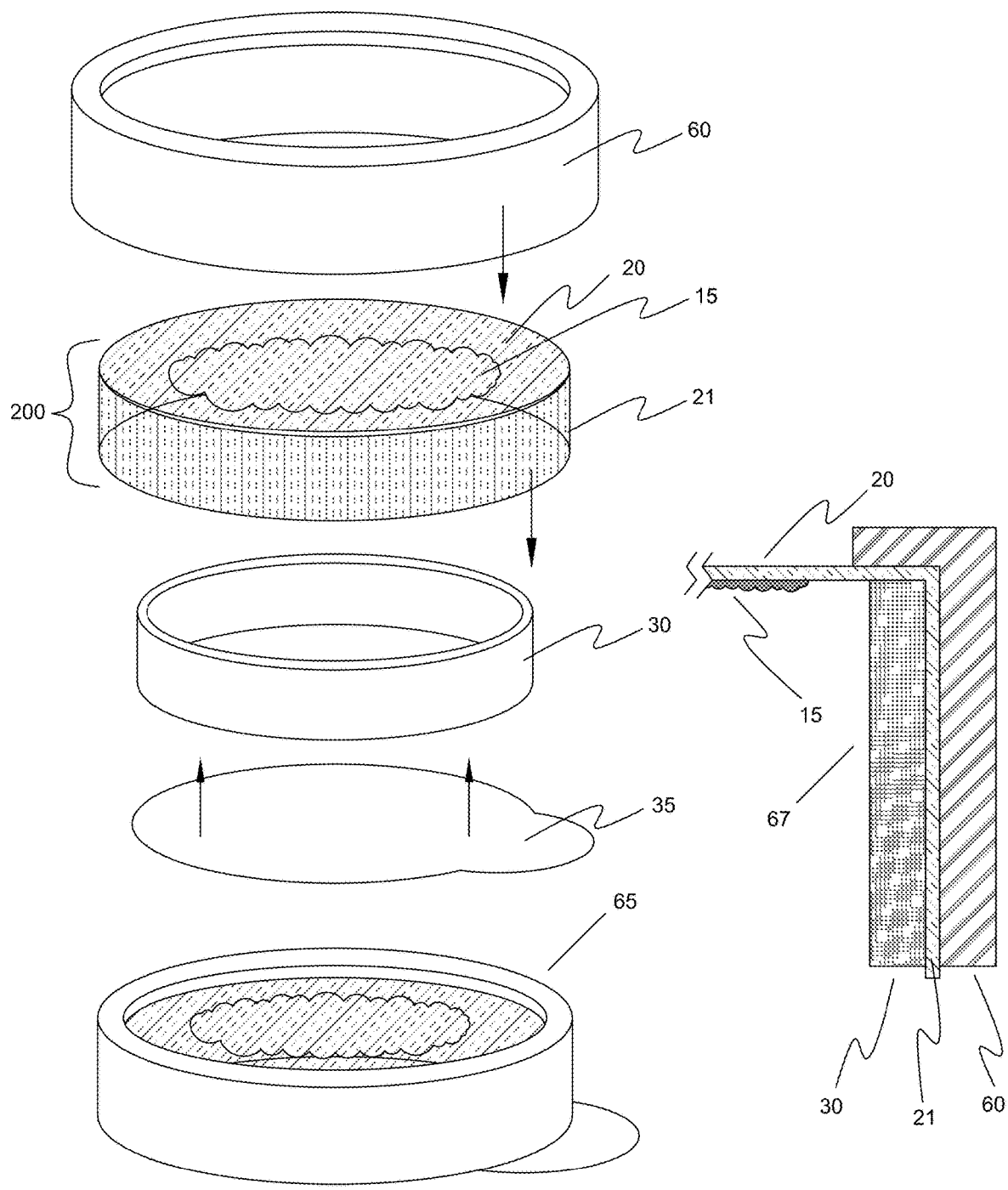
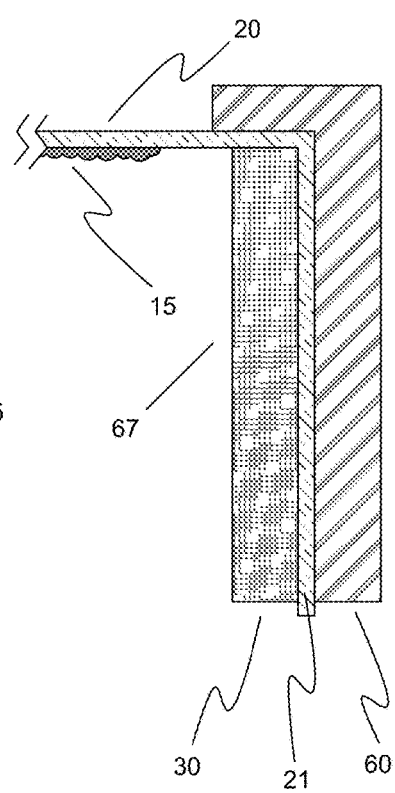
Fig. 2A
Fig. 2B

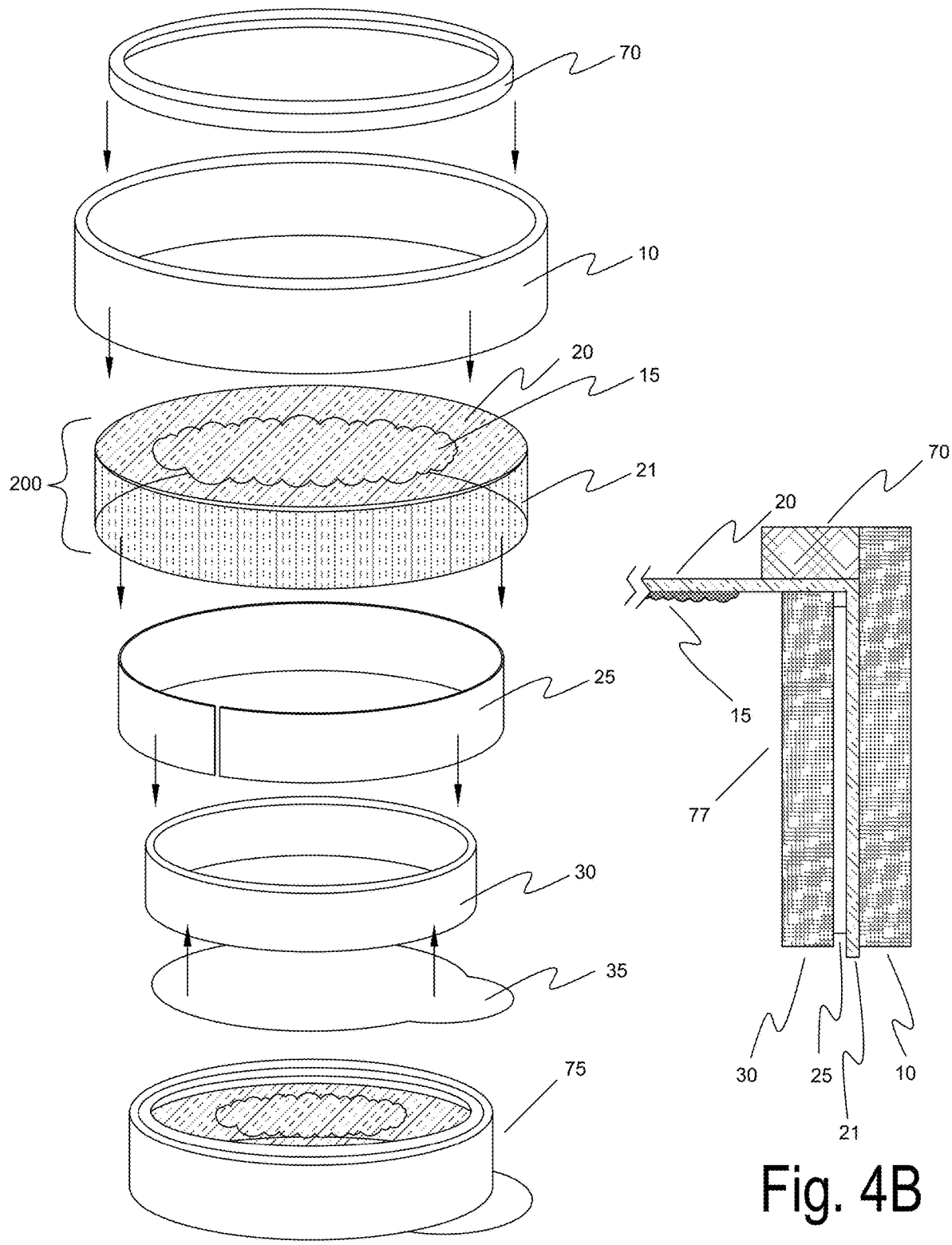

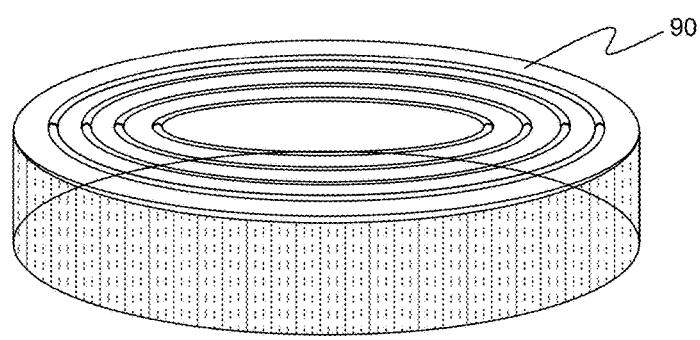
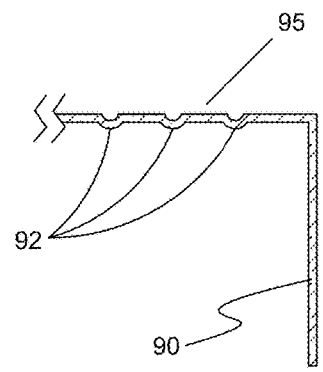
Fig. 6A  Fig. 6B
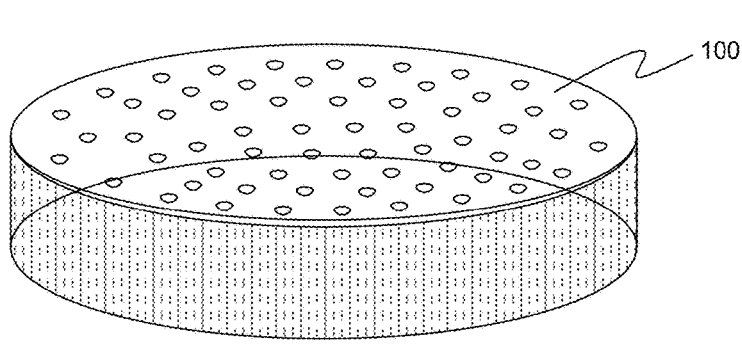
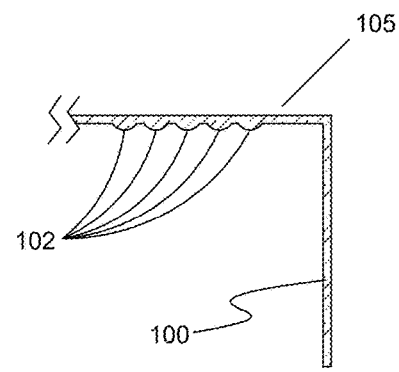
Fig. 6C  Fig. 6D

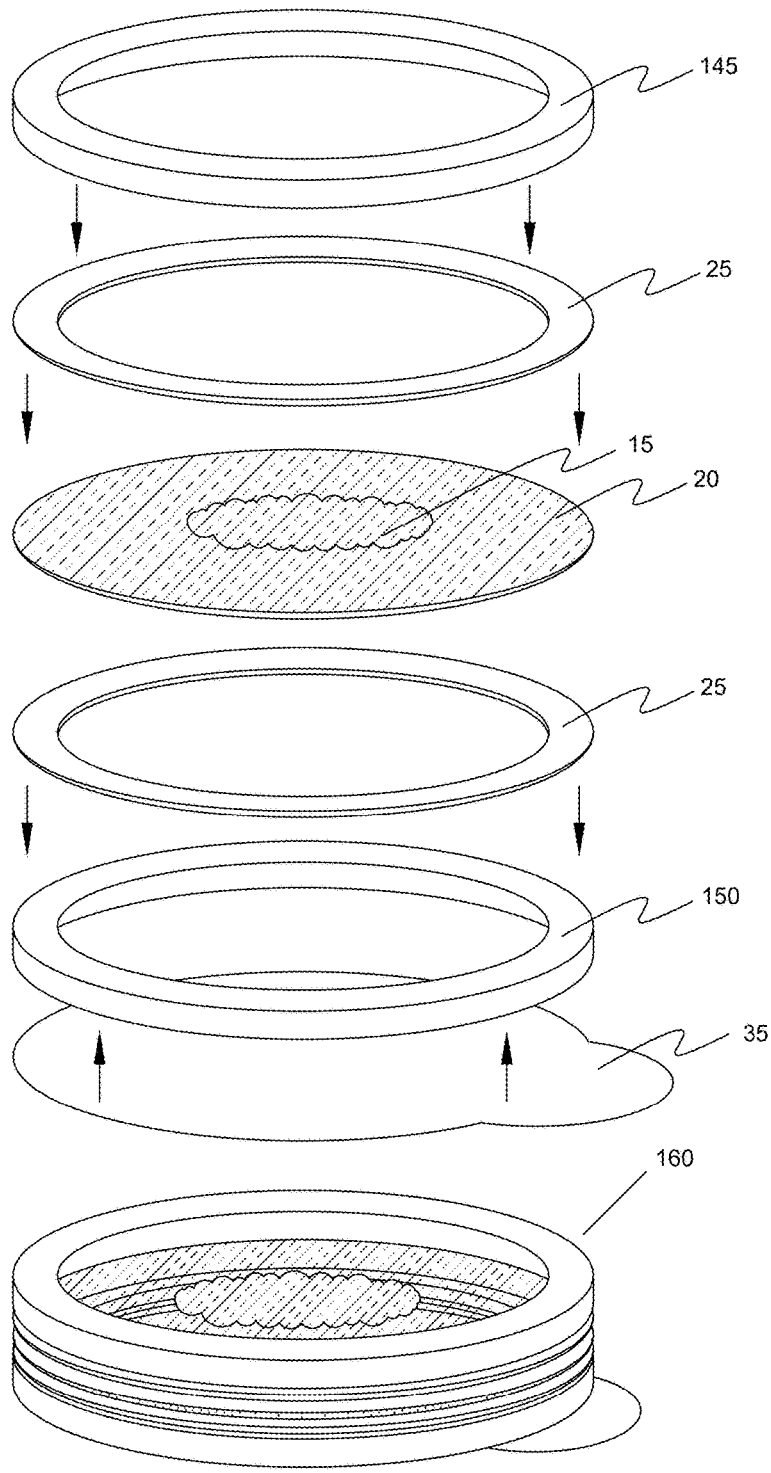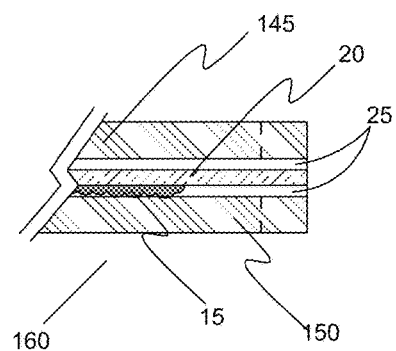
Fig. 13B
Fig. 13A

LUBRICANT APPLICATOR FOR A BALL HITCH

CROSS-REFERENCE TO RELATED APPLICATIONS

This application claims priority to U.S. Provisional Patent Application No. 63/156,489 filed Mar. 4, 2021, which is incorporated by reference herein.

BACKGROUND OF THE INVENTION

A ball hitch (also referred to as a "hitch ball" or a "trailer ball") is the portion of a trailer hitch assembly that is attached to the frame of a towing vehicle, the bumper of a towing vehicle, or is installed in the bed of the towing vehicle. An object being towed includes a trailer coupler which is fitted over the ball hitch to join the towed object with the vehicle. The assembly secures the trailer and allows horizontal pivoting during motion of the vehicle. It is recommended practice to lubricate the ball hitch. This reduces hitch ball and coupling surface wear, failure risk and maintenance costs for the assembly, while providing corrosion protection and noise reduction. Examples of lubricant (lubrication) used for this purpose include wheel bearing grease, white grease, and gel lube. The lubricant is typically sold in jars, squeeze tubes, or for lower viscosity options, in spray cans.

The lubricant is typically applied by spreading a desired amount of the lubricant on the ball hitch using a brush, rag, fingers, or by spraying the ball hitch from a tube attached to a spray can and wiping away excess lubricant. Current application methods are messy, risk too little or too much lubrication, and require various levels of post-application clean-up.

Accordingly, there is an unmet need for an improved device and process to apply a consistent amount of lubricant to a ball hitch in a simple and clean manner that avoids any necessity for clean-up. The present invention fulfills such a need.

SUMMARY OF THE PRESENT INVENTION

A lubricant applicator for a ball hitch includes a diaphragm assembly, a hollow support structure, and preferably, a removable cover. The diaphragm assembly includes a diaphragm member and may also include a peripheral sidewall. The diaphragm member has a non-permeable top surface having an inner facing surface and an outer facing surface. A central region of the inner facing surface is coated with lubricant that is releasable from the inner facing surface when pressed against an external surface and, optionally, rotated slightly. The hollow support structure has a peripheral sidewall. The diaphragm assembly is positionally secured within the hollow support structure to provide a unitary structure. The lubricant-coated central region of the diaphragm member is configured to deform and partially encapsulate at least an upper portion of the ball hitch when the lubricant applicator is centered over the ball hitch and pressed down over the ball hitch to allow release and transfer of at least a portion of the lubricant from the inner facing surface of the diaphragm member to the at least upper portion of the ball hitch.

BRIEF DESCRIPTION OF THE DRAWINGS

Preferred embodiments of the present invention will now be described by way of example with reference to the accompanying drawings:

FIG. 2A is an exploded and an assembled view of a lubricant applicator having a lipped ring, a diaphragm, and an inner ring device, in accordance with another preferred embodiment of the present invention.

FIG. 2B is a cross-section view of a fully assembled lubricant applicator of FIG. 2A.

FIG. 4A is an exploded and an assembled view of a lubricant applicator having an outer ring, diaphragm, adhesive, an inner ring, and a locking ring device, in accordance with another preferred embodiment of the present invention.

FIG. 4B is a cross-section view of a fully assembled lubricant applicator of FIG. 4A.

FIG. 6A is a diaphragm of the lubricant applicator with raised concentric ring ridges, in accordance with another preferred embodiment of the present invention.

FIG. 6B is a cross-section view of FIG. 6A.

FIG. 6C is a diaphragm of the lubricant applicator with raised stippling, in accordance with another preferred embodiment of the present invention.

FIG. 6D is a cross-section view of FIG. 6C.

FIG. 13A is an exploded and an assembled view of a lubricant applicator having two flat rings, and a diaphragm compressed therebetween, in accordance with another preferred embodiment of the present invention.

FIG. 13B is a cross-section view of a fully assembled lubricant applicator of FIG. 13A.

DETAILED DESCRIPTION OF THE INVENTION

Figures 1A, 1B:
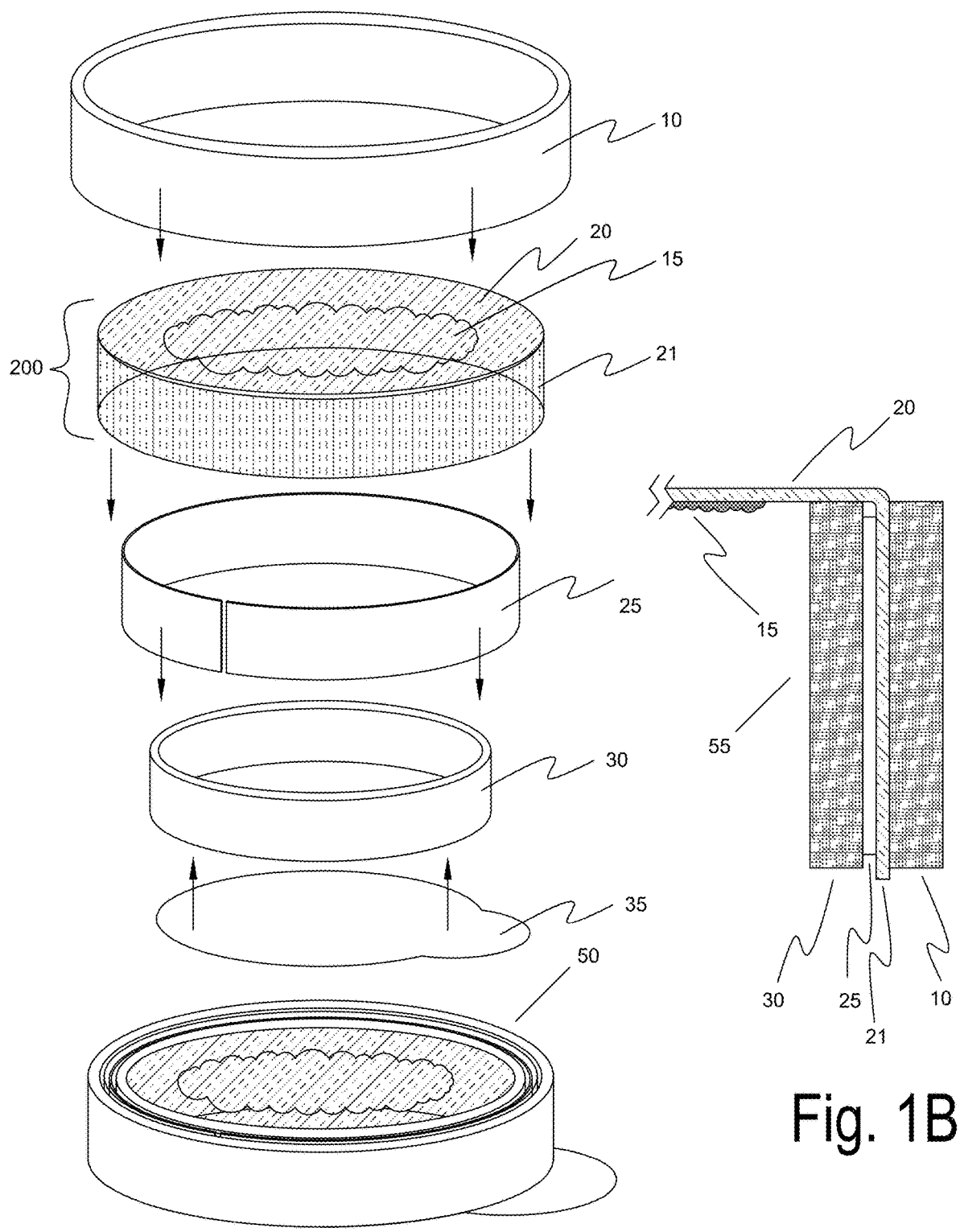
FIG. 1A is an exploded and an assembled view of a lubricant applicator having an outer ring, diaphragm, adhesive, and an inner ring device, in accordance with one preferred embodiment of the present invention.
FIG. 1B is a cross-section view of a fully assembled lubricant applicator of FIG. 1A.

Certain terminology is used herein for convenience only and is not to be taken as a limitation on the present invention.

The words "right," "left," "lower," and "upper" designate directions in the drawings to which reference is made. The words "inwardly" or "distally" and "outwardly" or "proximally" refer to directions toward and away from, respectively, the geometric center or orientation of the telescopic screw assembly and related parts thereof. Unless specifically set forth herein, the terms "a", "an" and "the" are not limited to one element but instead should be read as meaning "at least one". The terminology includes the above-listed words, derivatives thereof and words of similar import.

It should also be understood that the terms "about," "approximately," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The same numbers are used to designate the same elements in each of the respective figures, except that element 50 is used in each of the different embodiments to refer to a "lubricant applicator" even though the construction differs in each of the embodiments.

The lubricant applicator 50 described herein is illustrated in each of the embodiments as being a unitary cylindrical structure formed of concentrically nested cylindrical elements. However, it should be understood that the scope of the present invention is not limited to a cylindrical form factor, and other geometries may be used, such as polygonal (e.g., rectangle, pentagon, hexagon, octagon) form factors which have nested polygonal elements. The cylindrical form factor has certain advantages with respect to ease and cost of construction over polygonal form factors.

FIGS. 8-11 illustrate in four sequences how lubricant applicator 50 of the present invention is used to apply lubricant to a portion of ball hitch 130, and provides a foundation to better understand the various embodiments that are described in the remaining figures.

Figure 8:
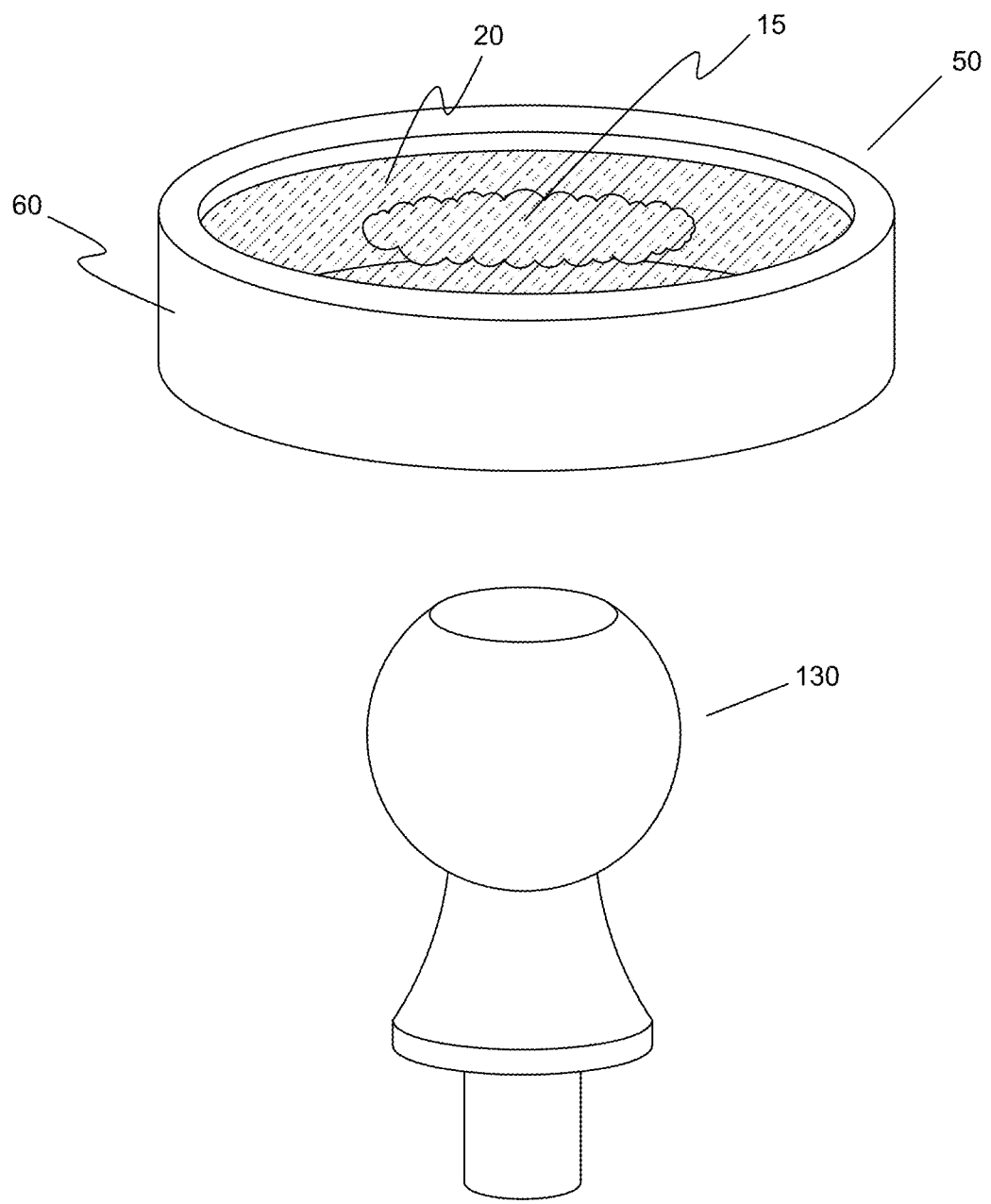
FIG. 8 is a view of pre-application of lubricant of the lubricant applicator in relation to the ball hitch (1st in sequence).

FIG. 8: First, the lubricant applicator 50 is centered over the ball hitch 130, as shown in FIG. 8. The lubricant applicator 50 includes diaphragm member 20 having a non-permeable top surface. The top surface has an inner facing surface and an outer facing surface. A central region of the inner facing surface is coated with lubricant 15 that is releasable from the inner facing surface when pressed against an external surface (here, an upper portion of the ball hitch 130) and, optionally, rotated slightly. The lubricant applicator 50 is an assembly of at least two main parts, namely, the diaphragm member 20 and a hollow support structure, which, in one embodiment shown in FIGS. 2A and 2B, has a form factor of a lipped ring, labeled as element 60 in FIGS. 2A and 2B. The diaphragm member 20 is positionally secured within the hollow support structure (here, the lipped ring 60) to provide a unitary structure. The hollow support structure may have other constructions, as described in other embodiments below. However, for ease of explanation, the lipped ring embodiment is illustrated in FIGS. 8-11.

Figure 9:
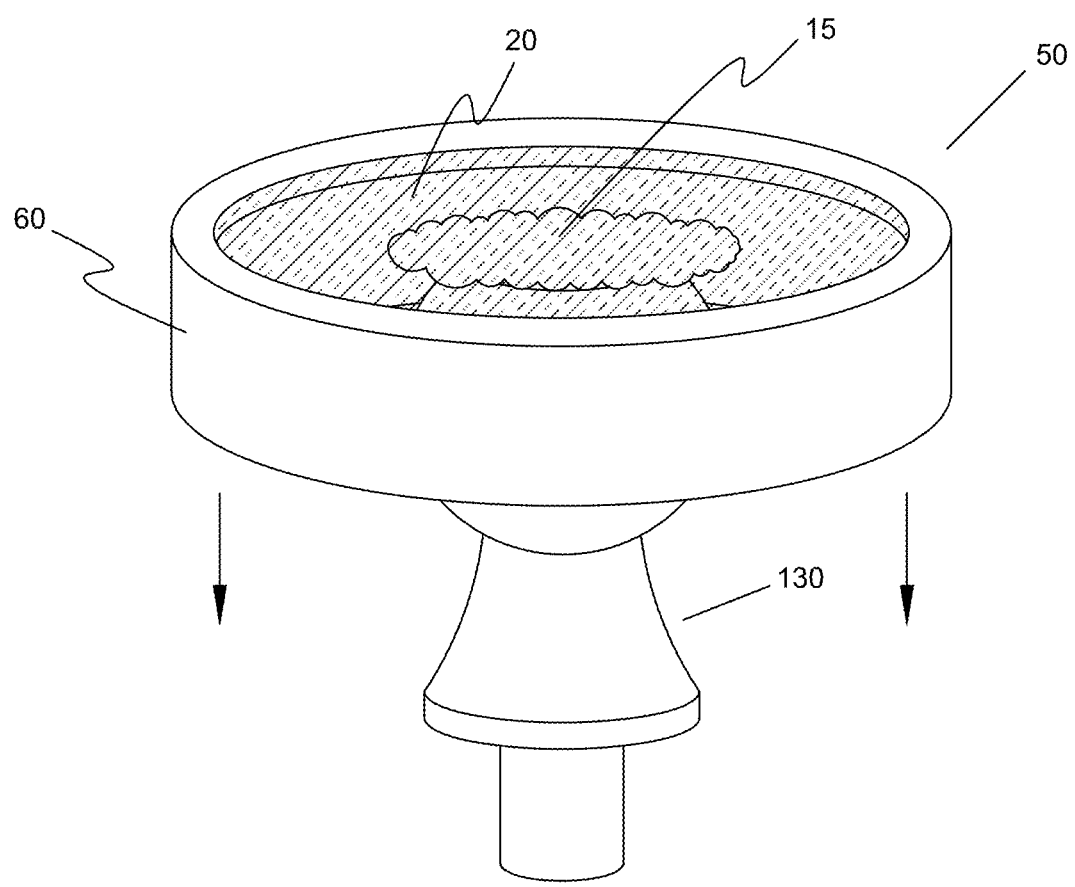
FIG. 9 is a view of the initial downward application of the lubricant applicator on the ball hitch (2nd in sequence).

FIG. 9: Second, the lubricant applicator 50 is downwardly applied to the top surface of the ball hitch 130, such that the central region of the inner facing surface is centered over the top surface of the ball hitch 130.

Figure 10:
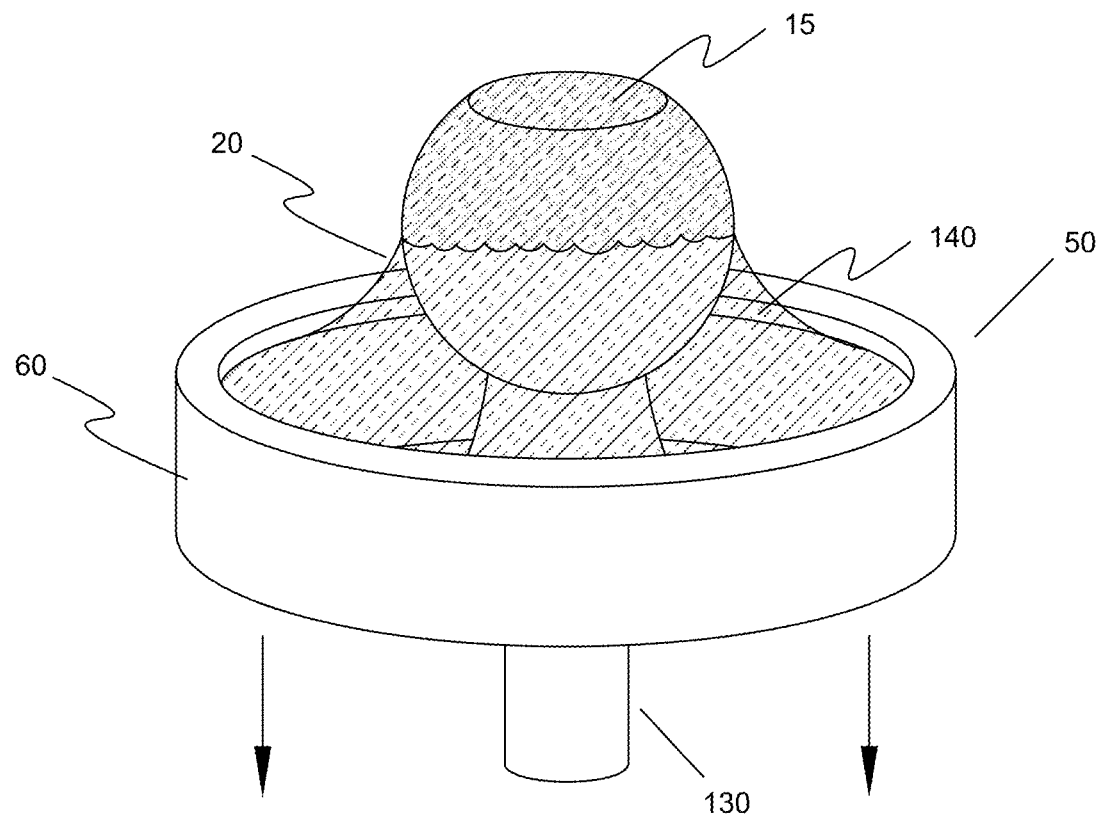
FIG. 10 is a view of a completed downward application of lubricant applicator on the ball hitch (3rd in sequence).

FIG. 10: Third, the lubricant applicator 50 is pressed down over the ball hitch 130, and is optionally rotated slightly, to allow release and transfer of at least a portion of the lubricant 15 to at least the upper portion of the ball hitch 130. Downward forces are applied to the hollow support structure (here, via an upper peripheral surface of the lipped ring 60). More specifically, the lubricant-coated central region of the diaphragm member is configured to deform and partially encapsulate at least an upper portion of the ball hitch 130.

The lip portion of the lipped ring 60 inhibits the diaphragm member 20 from separating from the lipped ring 60 as the lubricant applicator 50 is pressed down over the ball hitch 130. Stated another way, the lip portion of the lipped ring 60 holds the diaphragm member 20 firmly in place within the lipped ring 60 as the lubricant applicator 50 is pressed down over the ball hitch 130. In other embodiments which do not have a lip on the hollow support structure, alternative structure accomplishes the same goal as this lip portion.

Figure 11:
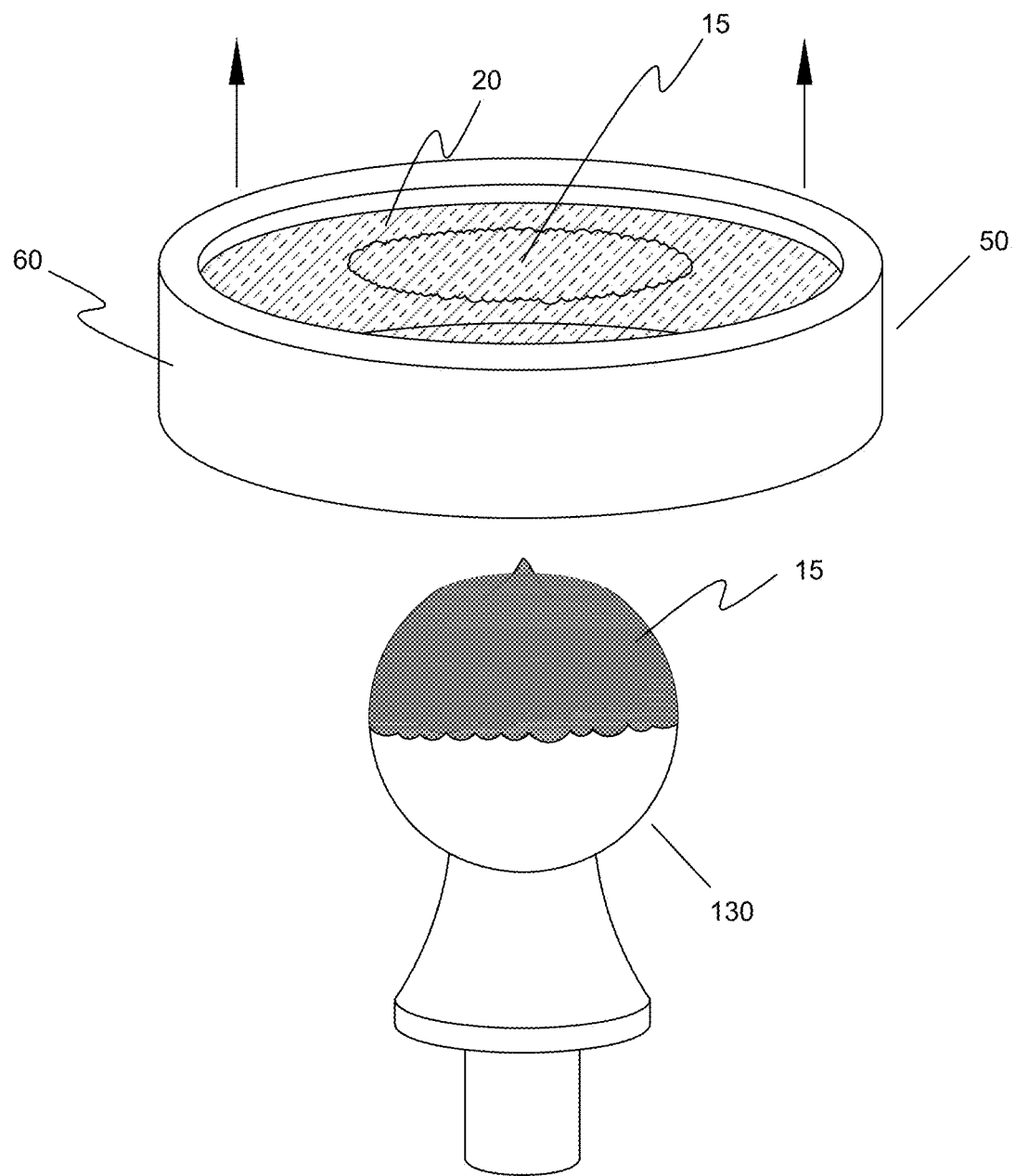
FIG. 11 is a view of the removal of the lubricant applicator and the ball hitch now covered with lubricant (4th in sequence).

FIG. 11: Fourth, the lubricant applicator 50 is lifted up from the ball hitch 130, and the upper portion of the ball hitch 130 is now covered with a portion of the lubricant 15. The remaining portion of the lubricant 15 is still present on the inner facing surface of the diaphragm member 20. Ideally, all of the lubricant 15 would be transferred from the lubricant applicator 50 to the ball hitch 130, but in practice, a perfect transfer would not likely be achievable, and some residue of lubricant 15 will remain on the inner facing surface of the diaphragm member 20. The scope of the present invention is not limited to any particular amount or type of lubricant.

The diaphragm member 20 is semi-flexible, and in one preferred embodiment illustrated in FIGS. 10 and 11, the diaphragm member 20 is elastically flexible so that it returns substantially to its original form when the forces applied against it are removed. However, the diaphragm member 20 may also be plastic in nature, in which case it would not return to its original shape. In embodiments wherein the lubricant applicator 50 is a one-time use, disposable item, it is not necessary for the diaphragm member 20 to be elastically flexible.

FIG. 1A is an exploded and an assembled view of lubricant applicator 50 in accordance with one preferred embodiment of the present invention. Referring to the exploded portion of FIG. 1A, the lubricant applicator 50 includes hollow outer support structure 10 (also, referred to interchangeably as "hollow support structure" and "outer ring 10"), diaphragm assembly 200, lubricant 15, adhesive 25, hollow inner support structure 30 (also, referred to interchangeably as "inner ring 30"), and optionally, cover 35.

The diaphragm assembly 200 includes diaphragm member 20 and a peripheral sidewall 21, which, together, form a unitary structure. In one preferred embodiment, these two parts are formed as a single constructed (e.g., molded) piece. Thus, in one embodiment, the diaphragm assembly 200 is a unitary and homogeneous structure, wherein the diaphragm member 20 and the peripheral sidewall 21 are formed of the same material. One suitable material for the diaphragm assembly 200 is silicone, although the scope of the present invention is not limited to any particular material. The diaphragm member 20 has a non-permeable top surface. The top surface has an inner facing surface and an outer facing surface. (The inner facing surface is the underside of the diaphragm member 20 when viewed from the perspective shown in FIG. 1A.) A central region of the inner facing surface is coated with the lubricant 15 that is releasable from the inner facing surface when pressed against an external surface. The non-permeable top surface inhibits the lubricant 15 from passing from the inner facing surface and an outer facing surface during storage and during use.

The lubricant applicator 50 of FIG. 1A is assembled as follows:

Step 1. The adhesive 25 is applied to an outer surface of the inner ring 30. The adhesive 25 may be a liquid (e.g., brush-on) or spray-on adhesive, or may be two-sided tape. If the adhesive 25 is two-sided tape, it is wrapped around the outer periphery of the inner ring 30.

Step 2. The inner ring 30 is positionally secured within the diaphragm assembly 200 by sandwiching the adhesive 25 between an inner surface of the diaphragm member's peripheral sidewall and the outer surface of the inner ring's peripheral sidewall. In one assembly process, the diaphragm assembly 200 is stretched around and over the inner ring 30 and its adhesive layer.

Step 3: The subassembly formed in Step 2 is then positionally secured within the outer ring 10 in a concentric manner, such as by a friction fit wherein an outer surface of the diaphragm assembly's peripheral sidewall frictionally engages an inner surface of the outer ring's peripheral sidewall. For example, the subassembly formed in Step 2 may be placed on a hard surface, and the outer ring 10 is slid down over the subassembly.

Step 4: If desired, the cover 35 is attached to the lubricant applicator 50 in any suitable manner. For example, the cover 35 may be attached to the lubricant applicator 50 using a bottom edge of one or more of the diaphragm assembly 200, the inner ring 30, and the outer ring 10. The cover 35 functions to cover and protect the lubricant 15 before application. The cover 35 can also function as a label for the lubricant applicator 50. The cover 35 is removed prior to application, thereby exposing the lubricant 15.

The bottommost portion of FIG. 1A shows the fully assembled lubricant applicator 50 with the cover 35 applied thereto, and FIG. 1B shows a cross-section view 55 of the fully assembled lubricant applicator 50 of FIG. 1A.

In the embodiment of FIG. 1A, the inner ring 30/adhesive 25 combination is particularly helpful to secure the diaphragm assembly 200 in place with respect to the outer ring 10 so that the diaphragm assembly 200 does not pop out of the outer ring 10 when pressed down over the ball hitch 130, as shown in FIG. 10, particularly since there is no lip on the outer ring 10 of the FIG. 1A embodiment to inhibit such movement from occurring. However, in the embodiment of FIG. 1A, the essential components include only the diaphragm assembly 200 and its lubricant 15, and the outer ring 10. With a sufficiently tight fit between the diaphragm assembly's peripheral sidewall and the outer ring 10, it may be possible to avoid any need for the inner ring 30/adhesive 25 combination, particularly if the forces experienced by the stretching of the diaphragm member 20 when pressing down on the ball hitch 130 are not sufficient to break the tight fit between the diaphragm assembly's peripheral sidewall and the outer ring 10.

FIG. 2A is an exploded and an assembled view of lubricant applicator 65 in accordance with another preferred embodiment of the present invention. Referring to the exploded portion of FIG. 2A, the lubricant applicator 65 includes hollow outer support structure 60 (also, referred to interchangeably as "hollow support structure" and "lipped ring 60"), diaphragm assembly 200, lubricant 15, hollow inner support structure 30 (also, referred to interchangeably as "inner ring 30"), and optionally, cover 35. Similar to the FIG. 1A embodiment, the diaphragm assembly 200 includes the diaphragm member 20 and the peripheral sidewall 21, which, together, form a unitary structure. The embodiment of FIG. 2A differs from the embodiment of FIG. 1A in that no adhesive 25 is needed because the lip of the lipped ring 60 provides sufficient protection in preventing the diaphragm assembly 200 from separating from the lubricant applicator 65 during use, as described above with respect to FIGS. 8-11. The embodiment of FIG. 2A also includes the inner ring 30, even though no adhesive 25 is applied to it. The inner ring 30 helps to seal the peripheral sidewall 21 of the diaphragm assembly 200 against the inner peripheral walls of the lipped ring 60, thereby providing for a more stable overall structure. However, similar to the FIG. 1A embodiment, the inner ring 30 is not an essential component of this embodiment.

The lipped ring embodiment of FIG. 2A may also more generically be viewed as the hollow support structure of FIG. 1A (outer ring 10) with the addition of an upper lip.

The lubricant applicator 65 of FIG. 2A is assembled in a similar manner as the lubricant applicator of FIG. 1A, except that Step 1 is omitted since no adhesive is used.

The bottommost portion of FIG. 2A shows the fully assembled lubricant applicator 65 with the cover 35 applied thereto, and FIG. 2B shows a cross-section view 67 of the fully assembled lubricant applicator 65 of FIG. 2A.

Figure 3A:
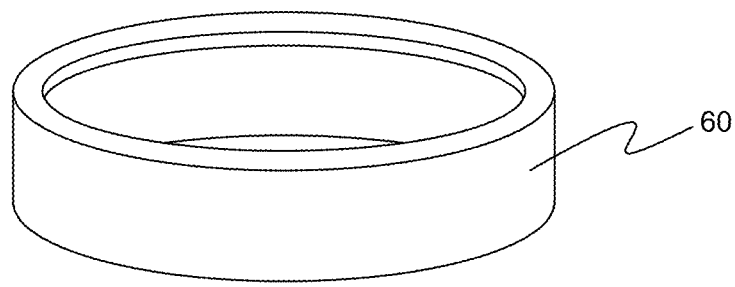
FIG. 3A is a perspective view of the lipped ring of FIG. 2A.
Figure 3B:
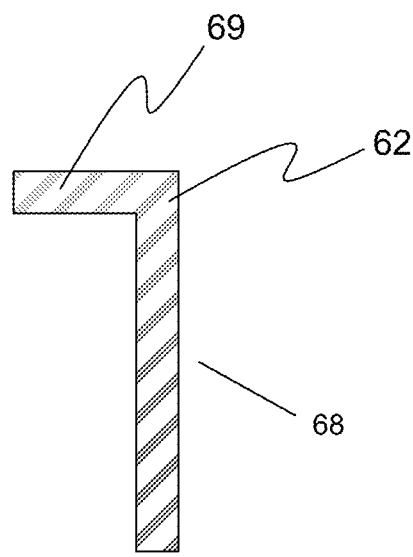
FIG. 3B is a cross-section view of the lipped ring of FIG. 3A.

FIG. 3A is a perspective view of the lipped ring 60 of FIG. 2A, and FIG. 3B is a cross-section view 68 of the lipped ring 60 of FIG. 3A. The cross-section view shows lip 69 and sidewall 62.

FIG. 4A is an exploded and an assembled view of lubricant applicator 75 in accordance with another preferred embodiment of the present invention. Referring to the exploded portion of FIG. 4A, the lubricant applicator 75 includes locking ring 70, outer ring 10, diaphragm assembly 200, lubricant 15, adhesive 25, inner ring 30, and optionally, cover 35. This embodiment is a combination of features of the FIGS. 1A and 2A embodiments. First, it includes the adhesive 25 of the FIG. 1A embodiment. Second, it includes the locking ring 70 which provides similar functionality as the lip 69 of the lipped ring 60 of FIG. 2A in that it provides an upper lip for the outer ring 10.

The locking ring 70 is positionally secured via friction fit to the inner peripheral sidewall of the outer ring 10 in a nested, concentric manner so that its upper edge is flush with the upper edge of the outer ring 10, as illustrated in the assembled view (bottommost portion of FIG. 4A and the cross-section view 77 of FIG. 4B. The locking ring 70 may alternatively have adhesive (not shown) applied to its outer peripheral surface before it is fitted into the outer ring 10.

The lubricant applicator 75 of FIG. 4A is assembled in a similar manner as the lubricant applicator of FIG. 1A, except for the additional step of adding the locking ring 70.

The bottommost portion of FIG. 4A shows the fully assembled lubricant applicator 75 with the cover 35 applied thereto, and FIG. 4B shows a cross-section view 77 of the fully assembled lubricant applicator 75 of FIG. 2A.

Figures 5A, 5B:
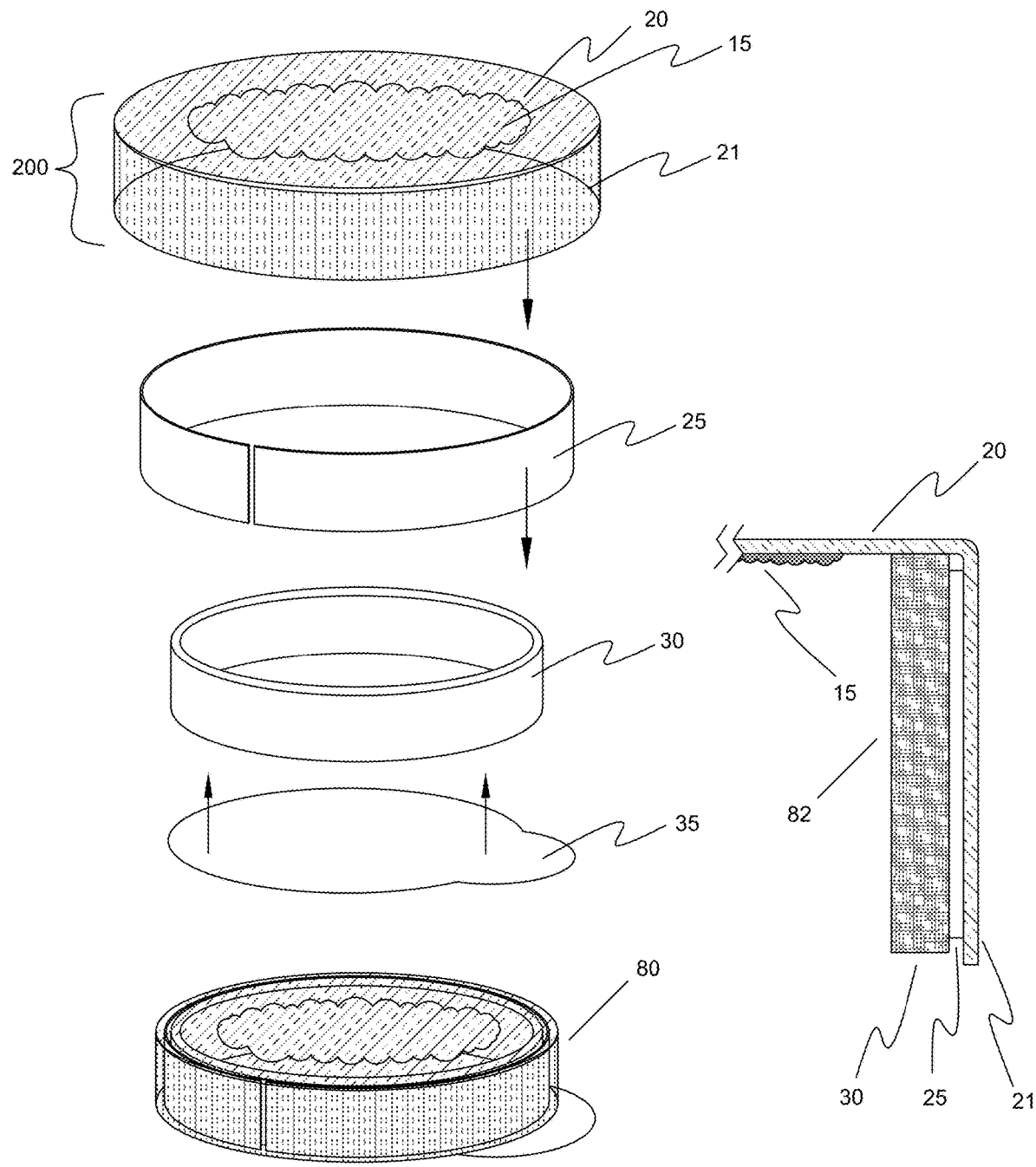
FIG. 5A is an exploded and an assembled view of a lubricant applicator having a diaphragm, adhesive, and an inner ring, in accordance with another preferred embodiment of the present invention.
FIG. 5B is a cross-section of a fully assembled lubricant applicator of FIG. 5A.

FIG. 5A is an exploded and an assembled view of lubricant applicator 80 in accordance with another preferred embodiment of the present invention. Referring to the exploded portion of FIG. 5A, the lubricant applicator 80 includes diaphragm assembly 200, lubricant 15, adhesive 25, inner ring 30, and optionally, cover 35. This embodiment is a simpler version of the FIG. 1A in that it does not include the outer ring 10. Here, the inner ring 30 provides sufficient support and rigidity to the overall structure so that no outer ring 10 is needed. This embodiment requires that the diaphragm assembly 200 be extremely well positionally secured to the inner ring 30 via the adhesive and frictional fit so that the diaphragm assembly 200 does not separate from the inner ring 30 during use. Also, the diaphragm assembly 200 is fully exposed in this embodiment since it is not protected by any outer ring, and thus it must be well-constructed to withstand rough handling.

The lubricant applicator 80 of FIG. 5A is assembled in a similar manner as the lubricant applicator of FIG. 1A, except that Step 3 is omitted because there is no outer ring 10.

The bottommost portion of FIG. 5A shows the fully assembled lubricant applicator 80 with the cover 35 applied thereto, and FIG. 5B shows a cross-section view 82 of the fully assembled lubricant applicator 80 of FIG. 5A.

FIG. 6A is a diaphragm assembly 90 for use with any of the lubricant applicators described above. The diaphragm assembly 90 has raised concentric ring ridges on its top surface which function to partially contain and surround the lubricant 15 when it is applied to the ball hitch 130, as well as during assembly. The ring ridges also provide an aesthetic effect. FIG. 6B is a cross-section view 95 of FIG. 6A which shows concentric ring ridges 92 of the diaphragm assembly 90.

FIG. 6C is a diaphragm assembly 100 for use with any of the lubricant applicators described above. The diaphragm assembly 100 has raised stippling on its top surface which provides both a functional purpose (explained below) and an aesthetic effect. FIG. 6D is a cross-section view 105 of FIG. 6C which shows stippling bumps 102 of the diaphragm assembly 100.

Figure 7A:
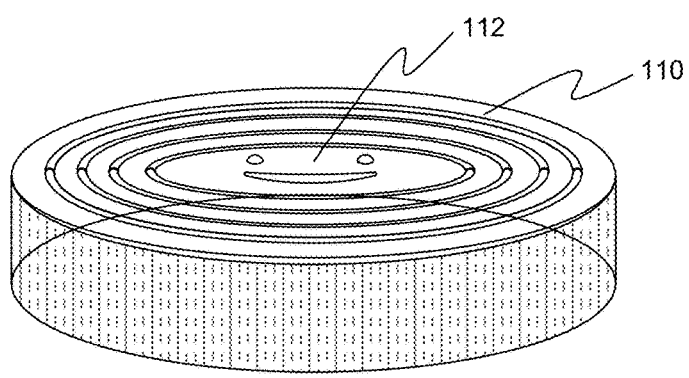
FIG. 7A is a diaphragm of the lubricant applicator with a raised image for producing a matching negative lubricant image on the device to be lubricated, in accordance with another preferred embodiment of the present invention.

FIG. 7A is a diaphragm assembly 110 for use with any of the lubricant applicators described above. The diaphragm assembly 110 is similar to the diaphragm assembly 90 of FIG. 6A in that it includes ring ridges 92, but it also includes a raised image 112 which is formed into the lubricant 15 on the inner facing top surface of the diaphragm assembly 110. In one embodiment shown in FIG. 7A, the raised image 112 is a "smiley face" ("Have a Nice Day") graphic icon. The raised image 112 is configured to produce a matching negative lubricant image on the device to be lubricated. That is, instead of the lubricant 15 being a solid film of material, small portions of the normally lubricated area contain substantially less lubricant, and those portions, in combination with the surrounding lubricated areas, form the raised image 112.

A flat membrane under sufficient force will result in lubricant applied thereto being pressed outward, leaving only a thin film on the hitch ball 130, at best. The stippling, rings, or any other indentation and/or bumps prevent the diaphragm member 20 from pressing flat to the surface of the hitch ball 130, thereby producing a predictable coating of lubricant 15 over its entire surface.

Figure 7B:
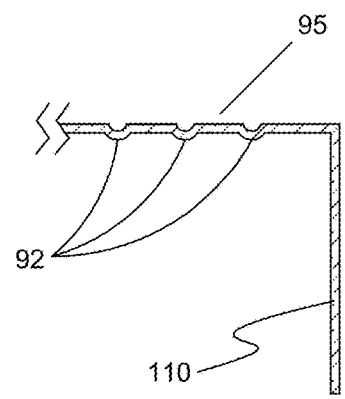
FIG. 7B is a cross-section view of FIG. 7A.
Figure 7C:
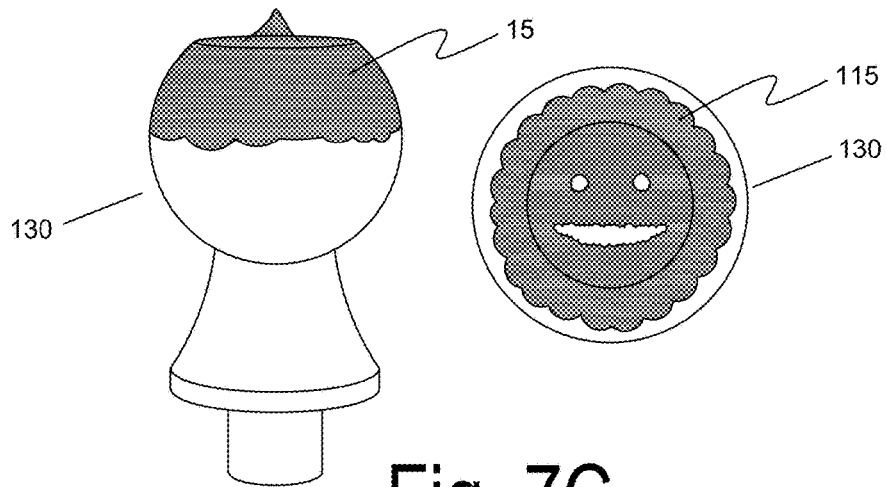
FIG. 7C is a side view and top view of a ball hitch with the FIG. 7A negative lubricant image depicted thereon.

FIG. 7B is a cross-section view 95 of FIG. 7A showing the ring ridges 92. FIG. 7C shows a side view and a top view of the ball hitch 130 with the FIG. 7A negative lubricant image 115 depicted thereon.

Figure 7D:
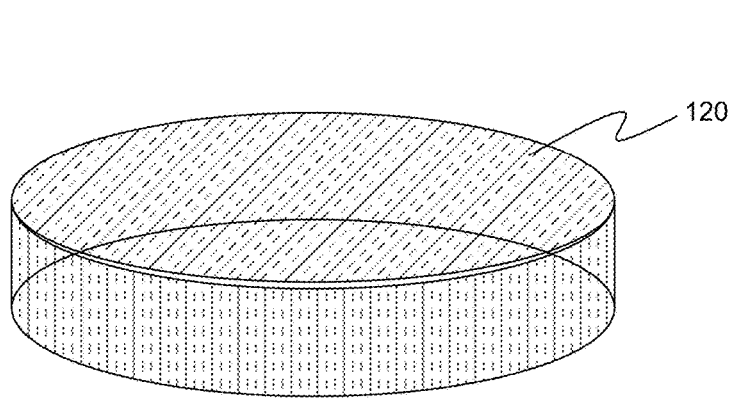
FIG. 7D is a diaphragm of the lubricant applicator with a flat surface, in accordance with another preferred embodiment of the present invention.
Figure 7E:
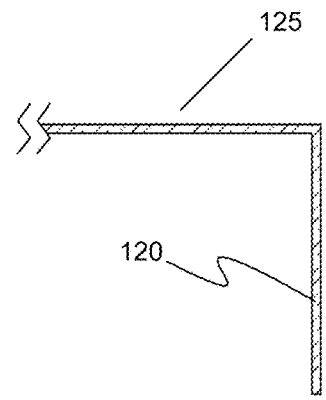
FIG. 7E is a cross-section view of FIG. 7D.

FIG. 7D is a flat-surfaced diaphragm assembly 120 for use with any of the lubricant applicators described above. The diaphragm assembly 120 of FIG. 7D is similar to the diaphragm assemblies shown in FIGS. 1A, 2A, 4A, and 5A, except that no lubricant 15 is depicted in the diaphragm assembly 120 FIG. 7D. FIG. 7E is a cross-section view 125 of FIG. 7D.

Figures 12A, 12B:
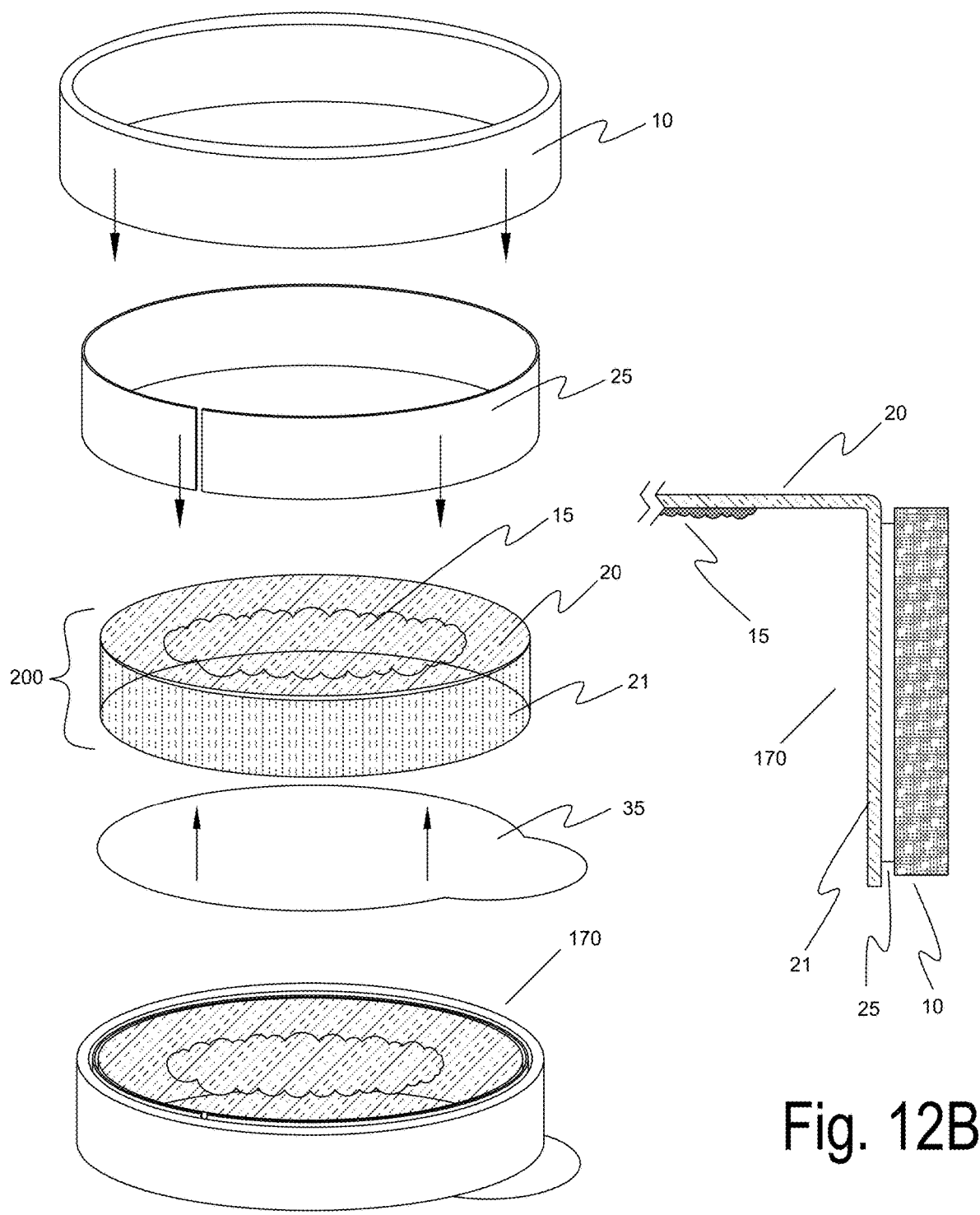
FIG. 12A is an exploded and an assembled view of a lubricant applicator having a single ring, diaphragm, and, adhesive, wherein the diaphragm is adhered to the inside of the ring, in accordance with another preferred embodiment of the present invention.
FIG. 12B is a cross-section view of a fully assembled lubricant applicator of FIG. 12A.

FIG. 12A is an exploded and an assembled view of lubricant applicator 170 in accordance with another preferred embodiment of the present invention. Referring to the exploded portion of FIG. 12A, the lubricant applicator 170 includes outer ring 10, adhesive 25, diaphragm assembly 200, lubricant 15, and optional cover 35. This embodiment differs from the embodiment of FIG. 1A in that no inner ring 30 is used to help secure the diaphragm assembly 200 to the outer ring 10. Instead, the adhesive 25 is applied to the peripheral sidewall of the diaphragm assembly 200, and then the diaphragm assembly 200 is positionally secured within the outer ring 10. This embodiment is feasible if the adhesive 25 can form a sufficiently strong bond between the peripheral sidewall of the diaphragm assembly 200 and the outer ring 10, such that this bond, in combination with the friction fit between the diaphragm assembly 200 and the outer ring 10, is sufficient to inhibit the diaphragm assembly 200 from separating from the outer ring 10 as the lubricant applicator 170 is pressed down over the ball hitch 130. Other bonding techniques, such as thermal, ultrasonic, stapling, and the like, may be used in place of the adhesive 25.

The bottommost portion of FIG. 12A shows the fully assembled lubricant applicator 170 with the cover 35 applied thereto, and FIG. 12B shows a cross-section view of the fully assembled lubricant applicator 170 of FIG. 12A.

FIG. 13A is an exploded and an assembled view of lubricant applicator 160 in accordance with another preferred embodiment of the present invention. Referring to the exploded portion of FIG. 13A, the lubricant applicator 170 includes top ring 145, adhesive 25, diaphragm member 20, lubricant 15, bottom ring 150, and optional cover 35. This embodiment differs from the embodiments above in that there is no peripheral sidewall associated with the diaphragm structure. Instead, the diaphragm structure includes only the diaphragm member 20 described above, which has a form factor of a planar surface, here, a circular disk. The diaphragm member 20 in this embodiment is sandwiched between the top ring 145 and the bottom ring 150. In the embodiment shown in FIG. 13A, adhesive 25 is applied to the top and bottom of the diaphragm member 20, and to the corresponding facing surfaces of the top ring 145 and the bottom ring 150, thereby bonding together the top ring 145, diaphragm member 20, and bottom ring 150 into a unitary structure. Similar to the embodiments above, the lubricant 15 is applied to a central region of the inner facing surface of the diaphragm member 20.

The bottommost portion of FIG. 13A shows the fully assembled lubricant applicator 160 with the cover 35 applied thereto, and FIG. 13B shows a cross-section view of the fully assembled lubricant applicator 160 of FIG. 13A.

In this embodiment, thermal bonding, stapling, or other fastening mechanisms may be used instead of the adhesive 25 to bond together the top ring 145, diaphragm member 20, and bottom ring 150 into a unitary structure. The bottom ring 150 is preferably of sufficient thickness to allow the lubricant 15 to be applied to the diaphragm member 20 and to allow the cover 35 to be attached, thereby covering the exposed lubricant 15 and providing sufficient spacing between the lubricant 15 and the cover 35 so that they do not touch one another in the final assembled form of the lubricant applicator 160, as illustrated in the bottommost portion of FIG. 13A.

Figure 14:
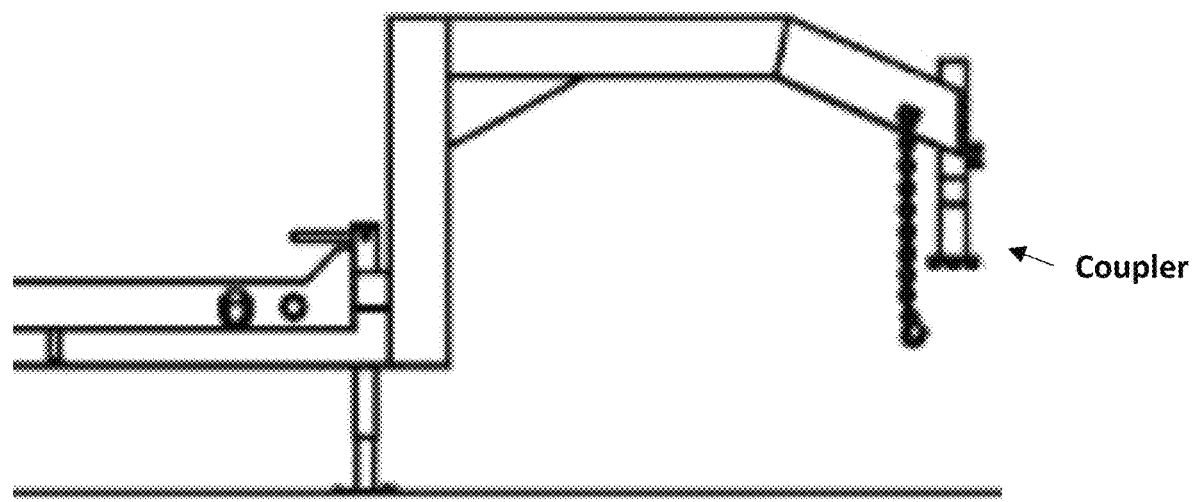
FIG. 14 is a perspective view of a prior art gooseneck coupler that may be used with the ball hitch of the present invention.

FIG. 14 is a perspective view of a prior art gooseneck coupler that may be used with the ball hitch 130 of the present invention. The ball hitch 130 shown in FIGS. 8-11 may be part of a trailer hitch assembly that is attached to the frame of a towing vehicle, the bumper of a towing vehicle, or is installed in the bed of the towing vehicle. When installed in the bed of the towing vehicle, the ball hitch 130 is configured to accept a gooseneck hitch. That is, the coupler portion of the gooseneck hitch is dropped onto the ball of the ball hitch 130. The ball hitch 130 is not readily accessible when installed in the bed of the towing vehicle. Accordingly, any of the lubricant applicators described above may be applied to the inner convex-shaped surface of the coupler portion of the gooseneck hitch by inverting the lubricant applicator with respect to the orientation shown in FIGS. 8-11, and pressing upward on the outer surface of the diaphragm member so as to apply the lubricant to the inner convex-shaped surface of the coupler portion of the gooseneck hitch.

ADDITIONAL CONSIDERATIONS

1. Lubricant Application

In the embodiments described above, the lubricant 15 is pre-applied to the diaphragm member 20, and thus the lubricant applicators described above all come with the lubricant 15 already applied, and ready to transfer to the ball hitch 130. However, in an alternative embodiment, any of the lubricant applicators described above may be fabricated without the lubricant 15. In these embodiments, the lubricant 15 is applied to the diaphragm member 20 when the ball hitch 130 is ready to be lubricated. For example, lubricant from a squeeze tube may be spread onto the central region of the inner facing surface of the diaphragm member 20, and then immediately applied to the ball hitch 130. The diaphragm member 20 may be provided with a marked application area indicating exactly where to apply the lubricant 15. This application process would still provide a goal of a non-messy application process, since no physical contact needs to be made between the lubricant 15 and a person's fingers. However, this embodiment is less preferred than the all-in-one pre-lubricated embodiment because the squeeze tube of lubricant must be purchased separately from the lubricant applicator.

Regarding the initial application of the lubricant 15 to the diaphragm member 20 in the pre-lubricated embodiment, the lubricant 15 is preferably in a viscous state when a lubricant applicator is readied for use. During manufacturing, the lubricant 15 may be slightly heated so that it can be easily dispensed and applied to the diaphragm member 20. Upon cooling, it would return to the desired viscous state.

2. Reusable Hollow Outer Support Structures

In the embodiments described above, the diaphragm assemblies 200 are fixedly secured to their respective hollow support structure in a manner that prevents the hollow support structure from being reused. However, in an alternative embodiment, the diaphragm assembly 200 may be removably secured to the hollow support structure to allow for reuse of the hollow support structure with another diaphragm assembly 200. For example, the embodiments of FIGS. 2A, 4A which employ the lipped ring 60 (FIG. 2A) and outer ring 10/locking ring 70 combination are particularly suitable for reuse because no adhesive is used to attach the diaphragm assembly 200 to their respective hollow support structures. In these embodiments, a single reusable hollow support structure may be bundled with a plurality of diaphragm assemblies 200 which are pre-assembled to include the inner ring 30, and either pre-lubricated, or sold unlubricated as described above. During use, one of the pre-assembled diaphragm assemblies 200 is inserted into the hollow support structure. After application of the lubrication to the ball hitch 130 as illustrated in FIGS. 8-11, the diaphragm assembly 200 is removed, readying the hollow support structure to receive another diaphragm assembly 200.

3. Sample Materials for Hollow Support Structure

The hollow support structures described herein may be fabricated of any suitable material that allows them to accomplish their intended functions. Suitable materials for the lipped ring 60 include, but are not limited to, plastic, reinforced cardboard, rigid polymers, and composites.

4. Diaphragm Member Composition

As discussed above, in one embodiment, the diaphragm assembly 200 (and thus also the diaphragm member 20) is formed of silicone, or any moldable, deformable polymer or co-polymer. However, in alternative embodiments, the diaphragm member may be a durable collapsible bag-like material (e.g., a rubber sheath) having lubricant therein, and which can flexibly or malleably expand during application.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A lubricant applicator for a ball hitch comprising:
(a) a diaphragm assembly including:
(i) a diaphragm member having a non-permeable top surface, the top surface having an inner facing surface and an outer facing surface, a central region of the inner facing surface being coated with lubricant that is releasable from the inner facing surface when pressed against an external surface, and
(ii) a peripheral sidewall; and
(b) a hollow support structure having a peripheral sidewall, the diaphragm assembly being positionally secured within the hollow support structure to provide a unitary structure, the peripheral sidewalls of the diaphragm assembly and the hollow support structure being adjacent each other, and
wherein the lubricant-coated central region of the diaphragm member is configured to deform and partially encapsulate at least an upper portion of the ball hitch when the lubricant applicator is centered over the ball hitch and pressed down over the ball hitch to allow release and transfer of at least a portion of the lubricant from the inner facing surface of the diaphragm member to the at least upper portion of the ball hitch.

2. The lubricant applicator of claim 1 wherein the diaphragm assembly is a unitary and homogeneous structure, the diaphragm member and the outer peripheral sidewall of the diaphragm assembly being formed of the same material.

3. The lubricant applicator of claim 2 wherein the diaphragm assembly is formed of silicone.

4. The lubricant applicator of claim 1 further comprising:
(c) adhesive; and
(d) a hollow inner support structure having a peripheral sidewall, the hollow inner support structure being positionally secured within the diaphragm assembly,
and wherein the adhesive is sandwiched between an inner surface of the diaphragm member's peripheral sidewall and an outer surface of the hollow inner support structure's peripheral sidewall.

5. The lubricant applicator of claim 4 wherein the diaphragm assembly, the hollow support structure, and the hollow inner support structure are all cylindrically-shaped, the diaphragm assembly being positionally secured within the hollow support structure in a concentric manner, the hollow inner support structure also being positionally secured within the diaphragm assembly in a concentric manner.

6. The lubricant applicator of claim 1 wherein the diaphragm assembly and the hollow support structure are both cylindrically-shaped, the diaphragm assembly being positionally secured within the hollow support structure in a concentric manner.

7. The lubricant applicator of claim 1 wherein the diaphragm assembly is positionally secured within the hollow support structure via a friction fit,
wherein an outer surface of the diaphragm assembly's peripheral sidewall frictionally engages an inner surface of the hollow support structure's peripheral sidewall.

8. The lubricant applicator of claim 1 wherein the hollow support structure includes an upper lip, and a periphery of the outer facing surface of the diaphragm member's top surface is flush against an inner peripheral surface of the upper lip,
wherein the upper lip inhibits the diaphragm member from being pushed out of the hollow support member when the lubricant applicator is pressed down over the ball hitch.

9. The lubricant applicator of claim 1 wherein the diaphragm member is elastically flexible.

10. The lubricant applicator of claim 1 wherein the diaphragm assembly is removably secured to the hollow support structure to allow for reuse of the hollow support structure with another diaphragm assembly.

11. The lubricant applicator of claim 1 wherein the diaphragm assembly is fixedly secured to the hollow support structure.

12. The lubricant applicator of claim 1 wherein the lubricant is releasable from the inner facing surface when pressed against the external surface and rotated slightly.

* * * * *